United States Patent
Hider et al.

(10) Patent No.: US 8,610,598 B2
(45) Date of Patent: Dec. 17, 2013

(54) RECREATIONAL VEHICLE (RV) SLIDE-OUT PARKING INDICATOR APPARATUS

(75) Inventors: James M. Hider, San Martin, CA (US); Janice Marie Hider, San Martin, CA (US)

(73) Assignee: Jatcom Corporation, San Martin, CA (US)

( * ) Notice: Subject to any disclaimer, the term of this patent is extended or adjusted under 35 U.S.C. 154(b) by 137 days.

(21) Appl. No.: 13/207,401

(22) Filed: Aug. 10, 2011

(65) Prior Publication Data

US 2012/0050070 A1    Mar. 1, 2012

Related U.S. Application Data

(60) Provisional application No. 61/377,512, filed on Aug. 27, 2010.

(51) Int. Cl.
*B60Q 1/48* (2006.01)

(52) U.S. Cl.
USPC .................. 340/932.2; 116/28 R; 296/26.13; 296/1.04

(58) Field of Classification Search
USPC ........ 340/932.2; 116/28 R; 296/26.13, 26.01, 296/1.04
See application file for complete search history.

(56) References Cited

U.S. PATENT DOCUMENTS

| | | | | |
|---|---|---|---|---|
| 2,753,439 | A | * | 7/1956 | Greenfield .................... 362/549 |
| 4,042,816 | A | * | 8/1977 | Smoot ........................ 362/506 |
| 4,965,571 | A | * | 10/1990 | Jones ........................ 340/932.2 |
| 5,227,785 | A | | 7/1993 | Gann et al. |
| D359,252 | S | * | 6/1995 | Wilkes et al. ............... D10/110 |
| 5,617,072 | A | * | 4/1997 | McNeal ....................... 340/431 |
| D426,005 | S | * | 5/2000 | Reniger et al. ............... D26/28 |
| 6,213,047 | B1 | * | 4/2001 | Means et al. ............... 116/28 R |
| 6,644,235 | B2 | * | 11/2003 | Haynes ...................... 116/28 R |
| D544,386 | S | * | 6/2007 | Hamilton .................... D10/110 |
| 7,287,793 | B2 | * | 10/2007 | Hamilton .................... 296/1.04 |
| 7,322,625 | B2 | * | 1/2008 | Hamilton .................... 296/1.04 |
| 7,489,256 | B2 | | 2/2009 | Dergounov et al. |
| 7,573,402 | B2 | | 8/2009 | Herbert et al. |
| 7,891,691 | B2 | * | 2/2011 | Bearey ........................ 280/477 |
| 2003/0089296 | A1 | * | 5/2003 | Haynes ...................... 116/28 R |

* cited by examiner

*Primary Examiner* — Eric M Blount
(74) *Attorney, Agent, or Firm* — Mark Gonzales (57) ABSTRACT

In one embodiment, the present invention includes an apparatus to aid in parking a vehicle. The apparatus includes a mounting member, a horizontal member, a vertical member, and an indicator. The horizontal member is coupled to the mounting member. The horizontal member extends from the vehicle and defines a required distance from a side of the vehicle to a first periphery of a parking space. The vertical member is coupled to the horizontal member that defines a second periphery. The indicator is coupled to the vertical member such that the first periphery may be compared with the second periphery in aligning the vehicle within the parking space.

20 Claims, 7 Drawing Sheets

RECREATIONAL VEHICLE (RV) SLIDE-OUT PARKING INDICATOR APPARATUS

CROSS REFERENCE TO RELATED APPLICATIONS

The present application claims priority to U.S. Provisional Application No. 61/377,512 titled "Recreational Vehicle (RV) Slide-Out Parking Indicator Apparatus", filed Aug. 27, 2010.

BACKGROUND

The present invention relates to parking a recreational vehicle (RV), and in particular, to RV slide-out parking indicator apparatus.

RVs may be difficult to park due to their size. RVs may be as long as 40 feet and may be equipped with only two rear view mirrors to judge distances along the sides of the vehicle when parking. Typical RV parks have parking spaces which accommodate an RV with slide-outs.

Slide-outs extend and increase the internal living space when the vehicle is parked. When parking such an RV, the slide-outs are not extended, and a driver must judge the distances to align the RV such that there is enough room to accommodate the slide-outs within the designated parking space. Parking to accommodate the slide-outs using only the site provided by the rear view mirrors to align the vehicle may be a daunting task.

SUMMARY

Embodiments of the present invention improve vehicle parking. In one embodiment of present invention includes an apparatus to aid in parking a vehicle. The apparatus includes a mounting member, a horizontal member, a vertical member, and an indicator. The horizontal member is coupled to the mounting member to extend from the vehicle. The horizontal member defines a required distance from a side of the vehicle to a first periphery of a parking space. The vertical member is coupled to the horizontal member that defines a second periphery. The indicator is coupled to the vertical member such that the first periphery may be compared with the second periphery in aligning the vehicle with the parking space.

In one embodiment, the apparatus further includes a hinging member that couples the vertical member to the horizontal member such that the vertical member may swing while remaining at the second periphery.

In another embodiment, the mounting member is selectively coupled to the vehicle by mating of a magnet to a metal surface.

In yet another embodiment, the mounting member lies below the RV such that a portion of the horizontal member lies along the mounting member. The horizontal member may be selectively deployed when parking the vehicle.

In one embodiment, the apparatus further includes a swivel coupled between the mounting member and the vehicle such that the horizontal member may be selectively deployed.

In another embodiment, the apparatus further includes a gear coupled to the horizontal member and a stepper motor coupled to drive the gear. The stepper motor is driven such that the horizontal member may be incrementally deployed.

The following detailed description and accompanying drawings provide a better understanding of the nature and advantages of the present invention.

DETAILED DESCRIPTION

Described herein are techniques for apparatus to improve parking of vehicles. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
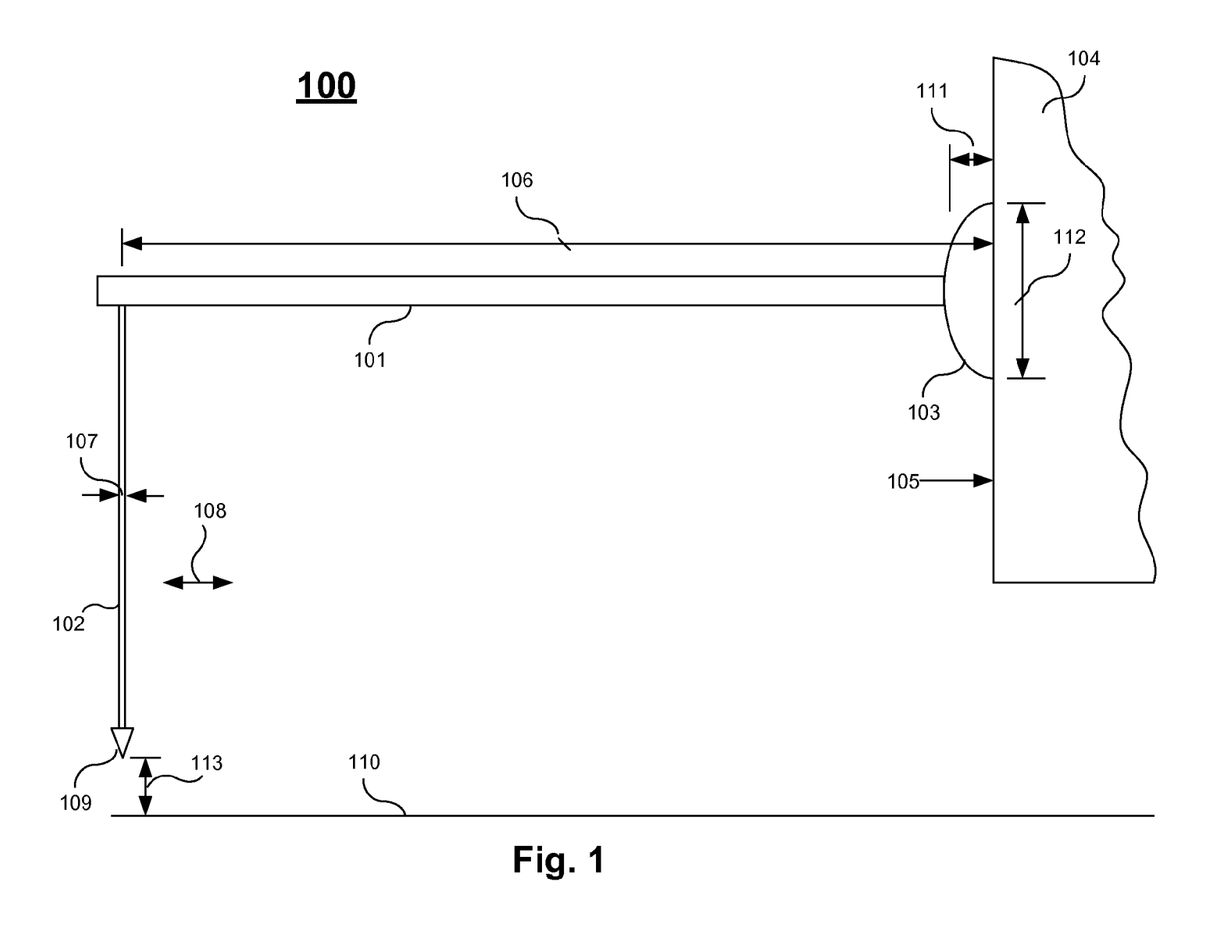
FIG. 1 illustrates a parking indicator apparatus according to one embodiment of the present invention.

FIG. 1 illustrates a parking indicator apparatus 100 according to one embodiment of the present invention. Parking indicator apparatus 100 includes a horizontal member 101, a vertical member 102, a mounting member 103, and an indicator 105. Horizontal member 101 is coupled to mounting member 103. Mounting member 103 is attached to side 105 of RV 104. Horizontal member 101 is coupled to vertical member 102, and indicator 109 is coupled to a lower portion of vertical member 102. Vertical member 101 extends vertical member 102 out from side 105 of RV 104, and thereby placing indicator 109 a distance 106 corresponding to clearance for an extended slide-out.

Mounting member 103 may be a suction cup having a width 112 and a depth 111 to provide sufficient mounting strength. Horizontal member 101 may be constructed of light weight tubing and may be inserted into a portion of a suction cup form of mounting member 103. Horizontal member 101 may remain secure and horizontal within mounting member 103 while no force is applied to vertical member 102 or horizontal member 101. The material of mounting member 103 (e.g. a rubber like suction cup such as Levelle 312HN or 400MS) may allow movement when a force is applied, and return to the initial position when the force is removed. This may prevent damage and/or a detachment of parking indicator apparatus 100 when, for example, the end of the horizontal member 101 or a portion of vertical member 102 come into contact with a stationary object when parking RV 104.

Vertical member 102 may be constructed of the same light weight material as horizontal member 101. In one embodiment, vertical member 102 may be hinged such that vertical member 102 may be folded into or along horizontal member 106. In one case, horizontal member 101 may be constructed as a "U" shaped tube or other partially open shape which would give rigidity and also allow vertical member 102 to fold into horizontal member 101.

Alternatively, vertical member 102 may be a light weight metal tape formed into a shape to resist movement in horizontal directions 108. For example, vertical member 102 may be formed like a construction measuring tape which has a slight bow across its thickness 107 which would inhibit movement in horizontal directions 108 and facilitate maintaining a vertical orientation. If the vertical member 102 were to deflect due to the movement of the RV 104, the material and form of vertical member 102 may serve to return vertical member 102 to its original vertical orientation prior to the deflection.

Indicator 109 may be heavier than vertical member 102 and help to keep the vertical member 102 in a vertical orientation. Indicator 109 may be shaped as a point as shown or be round. Indicator 109 may also be colored florescent or another bright color to make it more noticeable from a distance. Vertical member 102 has a length which places indicator 109 a distance 113 from the ground 110. The distance may be a few inches such as 3-4 inches, for example. This allows indicator 109 to hover above ground 110 while RV 104 is moving.

Figure 2:
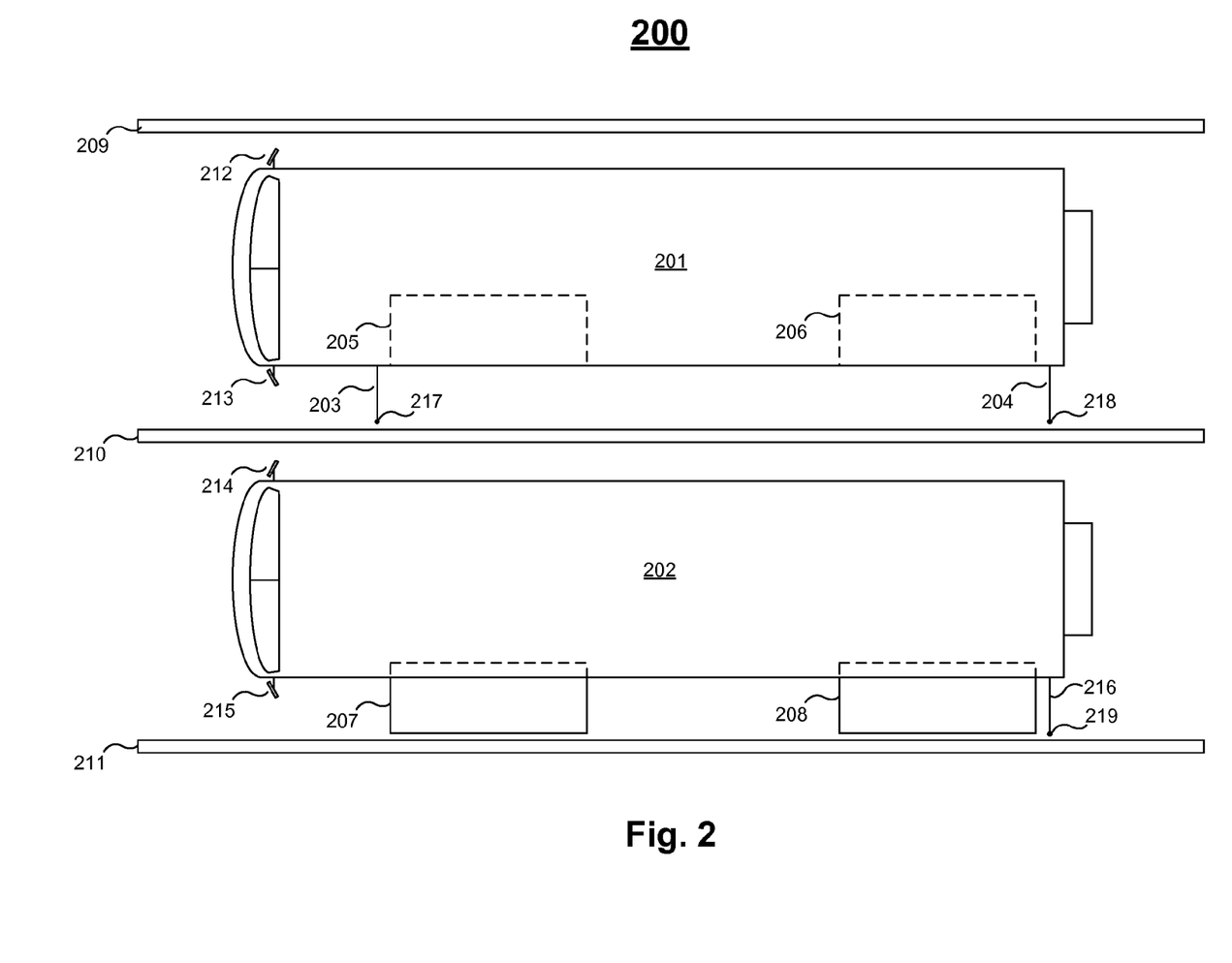
FIG. 2 illustrates an aerial view of a parking area with two parked RVs demonstrating the use of one embodiment of the present invention.

FIG. 2 illustrates an aerial view of a parking area 200 with two parked RVs (201, 202) demonstrating the use of one embodiment of the present invention. RV 201 has a location relative to parking line 209 and 210 just after a successfully parking. RV 201 includes slide-outs 205-206 in their non-extended positions, side rear view mirrors 212-213, and RV parking indicator apparatus 203-204. In this embodiment, parking indicator apparatus 203-204 includes indicators 217-218, and rear view mirrors 213 were used by the driver to align and park RV 201 within parking line 210.

Parking indicator apparatus 203-204 may be a temporarily mounted on the side of RV 201. Initially, RV 104 may approach the parking space separated by parking lines 209-210 and exit the vehicle to attach any number of parking indicator apparatus (e.g. apparatus 203-204). A user may attach slide-out indicator 203 in front of slide-out 205 and slide-out indicator 204 behind slide-out 206. Indicators 217-218 denote the actual extent of the slide-outs in the extended position, and therefore RV 201 is parked such that indicators 217-218 are slightly within parking line 210. In another embodiment, the indicators 217-218 may be designed such that they are slightly (4-5 inches) outside the slide-outs and the driver aligns the RV 201 with the indicators 217-218 directly above parking line 210. The number of RV parking indicator apparatus used depends on the size of the vehicle, the number of slide-outs or other extendable objects, and the user's preferences. For example, a driver may prefer to have an additional RV parking indicator apparatus between the RV parking indicator apparatus 203-204. A different driver may have a retractable awning on one side of the RV and a slide-out located on the opposite side. In this case, the user (i.e. the driver) may choose to put additional RV parking indicator apparatus on both sides of the vehicle to insure enough distance on each side of the RV to accommodate both the awning and the slide-out.

RV 202 is shown in a configuration after parking is completed and slide-outs 207-208 are in their extended positions. The slide-outs 207-208 may extend 2-3 feet out from the sides of RV 202. Parking indicator apparatus 216 includes indicators 219. Rear view mirrors 215 and RV parking indicator apparatus 216 were used by the driver to align and park RV 202 within parking line 211 (prior to extending slide-outs 207-208). Slide-outs 207-208 do not pass parking line 211 and extend a distance as indicated by parking indicator apparatus 216.

Figure 3:
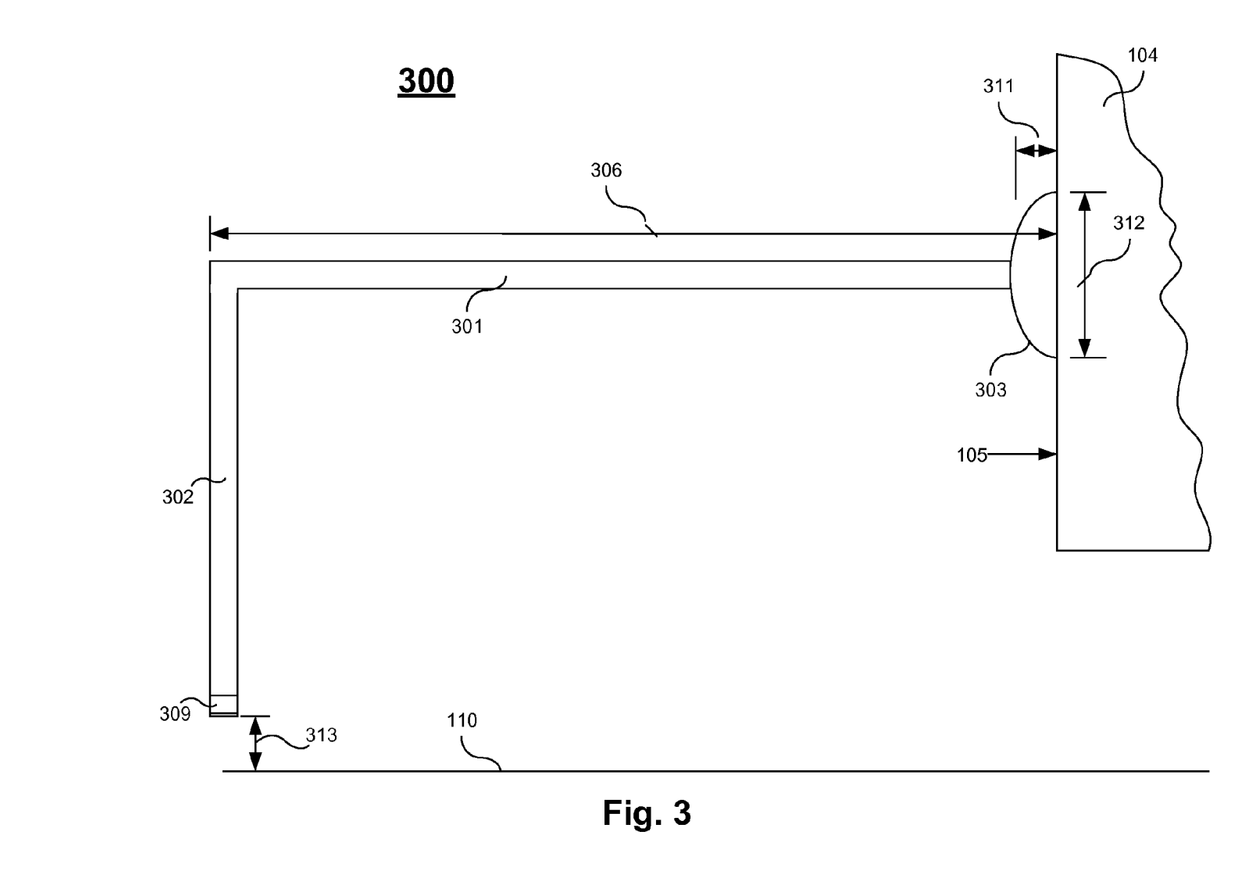
FIG. 3 illustrates a parking indicator apparatus according to another embodiment of the present invention.

FIG. 3 illustrates a parking indicator apparatus 300 according to another embodiment of the present invention. Parking indicator apparatus 300 includes a horizontal member 301, a vertical member 302, a mounting member 303, and an indicator 305. Horizontal member 301 is coupled to mounting member 303. Mounting member 303 is attached to side 105 of RV 104. Horizontal member 301 is coupled to vertical member 302, and indicator 309 is coupled to a lower portion of vertical member 302. Horizontal member 301 extends vertical member 302 out from side 105 of RV 104, and thereby placing indicator 309 a distance 306 corresponding to clearance for an extended slide-out. Vertical member 302 may be cut to provide a distance 313 from the bottom portion of the vertical member 302 and the ground 110.

In this embodiment horizontal member 301 and vertical member 302 are made from common material and have basically the same width. The tubing may be circular or square and horizontal member 301 and vertical member 302 may be joined (e.g. melded together) or may be formed from a single piece of material. Mounting member 305 may snap or clip onto a member (not shown) attached to side 105 of RV 104. This may allow for quick attachment and detachment from side 105.

Indicator 309 may be a reflector attached to the lower portion of vertical member 302. For example, indicator 309 may be reflective tape wrapped around the lower end of vertical member 302. In an alternative embodiment, indicator 309 may be a neon color such as neon yellow, for example.

In one embodiment, vertical member 302 and horizontal member 301 may be metal. In another embodiment, vertical member 302 and horizontal member 301 may be plastic. In yet another embodiment, horizontal member 301 may be constructed from two sections that are telescopic such that horizontal distance 306 may be adjusted.

Figure 4:
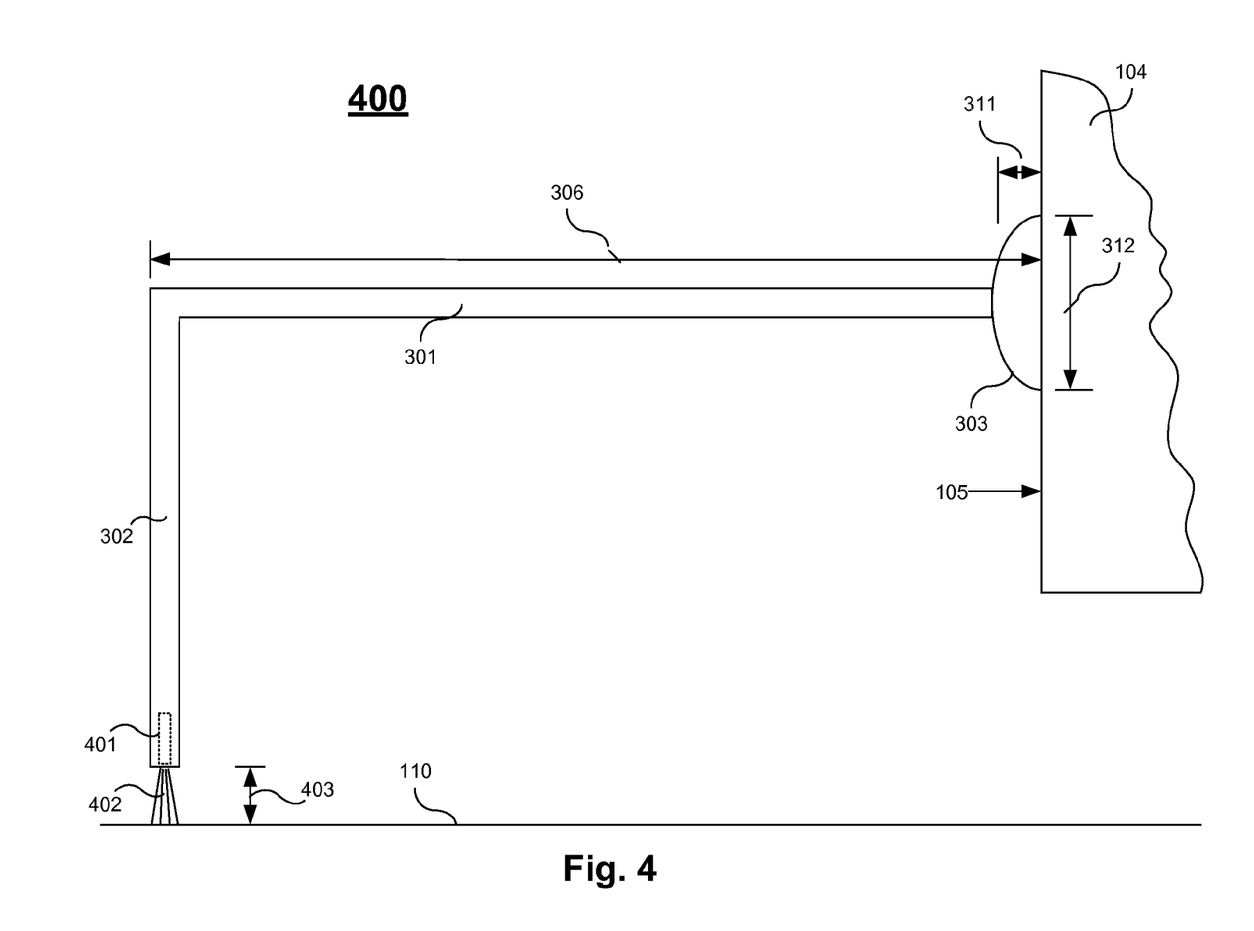
FIG. 4 illustrates a parking indicator apparatus according to yet another embodiment of the present invention.

FIG. 4 illustrates a parking indicator apparatus 400 according to yet another embodiment of the present invention. Parking indicator apparatus 400 includes horizontal member 301, vertical member 302, and mounting member 303 which have been described above in relation to FIG. 3. Parking indicator apparatus 400 further includes a light source 401 which provides light 402 over a distance 403. This may create a circle of light on ground 110 directly below vertical member 302. The light source may generate a colored light (e.g. green light) to further contrast with the black or dark colored ground 110. The light 402 may illuminate a bottom portion of vertical member 302 to indicate more clearly the location of the horizontal boundary presented by vertical member 302.

Figure 5:
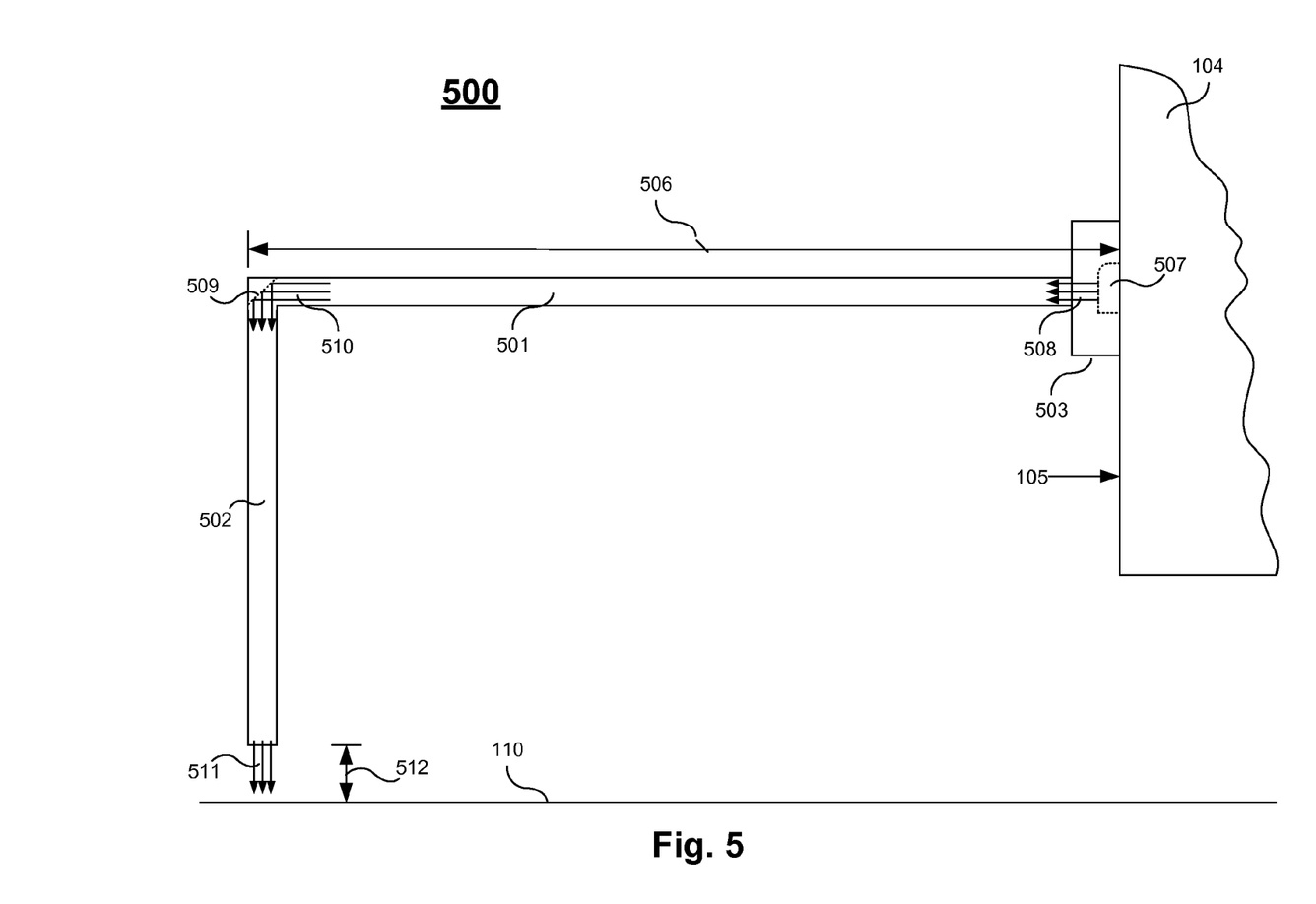
FIG. 5 illustrates a parking indicator apparatus according to one embodiment of the present invention.

FIG. 5 illustrates a parking indicator apparatus 500 according to one embodiment of the present invention. Parking indicator apparatus 500 includes horizontal member 501, vertical member 502, and mounting member 503 which are mechanically similar to horizontal member 301, vertical member 302, and mounting member 303 of FIG. 3. Mounting member 503 couples to side 105 and over RV side marker light 507 such that light rays (indicated by lines 508) travel through member 501 to reflective surface 509. Lines 510 indicate the light is reflected and travels through vertical member 502 and lines 511 indicate the light illuminates the ground 110 directly below vertical member 502. In one embodiment, at least a portion of the vertical member 502 is translucent and may be illuminated by the light rays. This may indicate more clearly the location of the horizontal boundary presented by vertical member 502.

Figure 6:
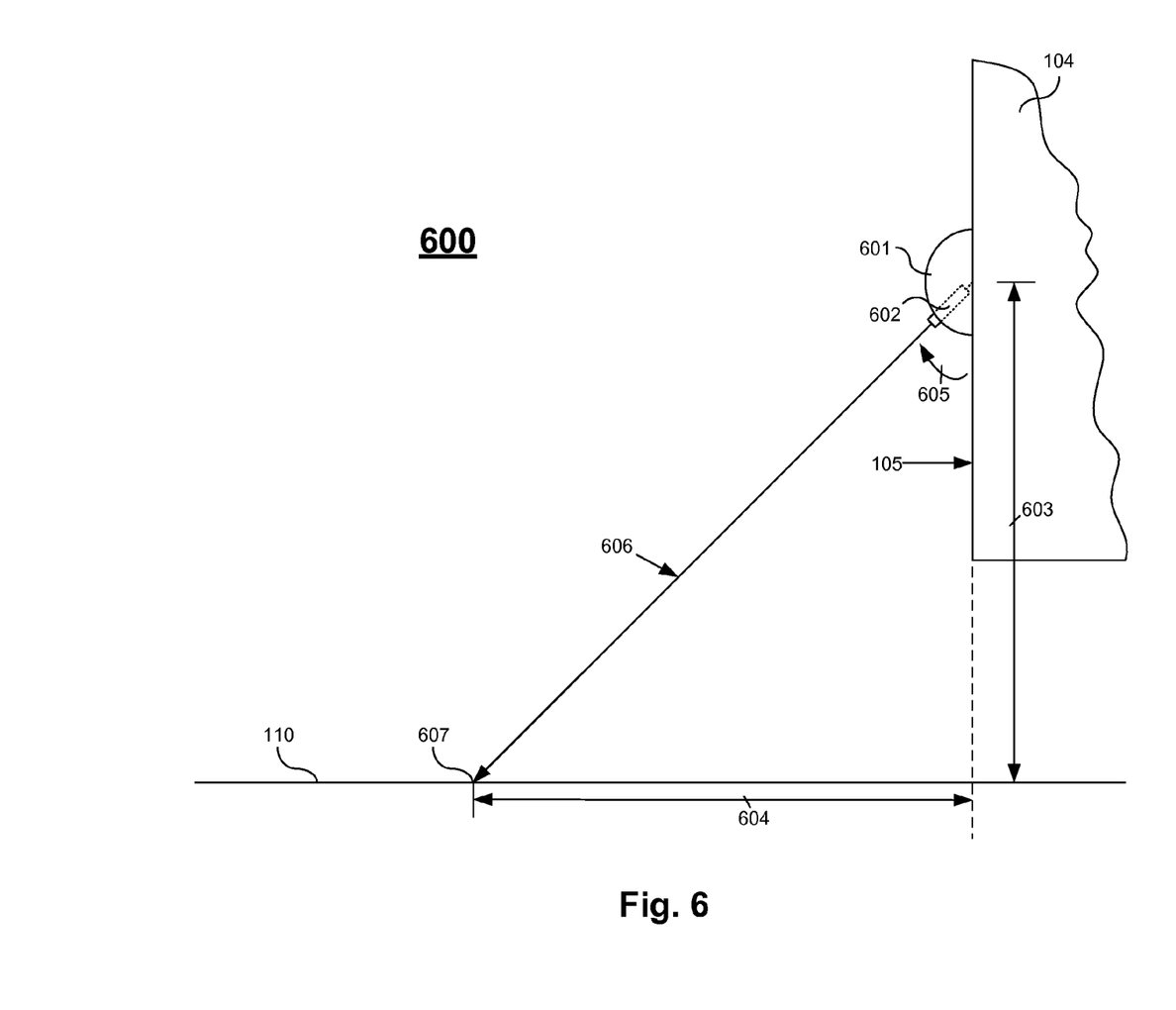
FIG. 6 illustrates a parking indicator apparatus according to another embodiment of the present invention.

FIG. 6 illustrates a parking indicator apparatus 600 according to another embodiment of the present invention. Parking indicator apparatus 600 includes mounted member 601 coupled to side 105 of RV 104 and a light source 602 arranged at angle 605 from side 105. Light source member 602 provides a light path 606 to point 607. If angle 605 is 45 degrees the height 603 will match length 604. In this case angle 605 and height 603 may set the distance 604 in which point 607 will be illuminated by light source member 602. The light source member 602 may be adjustable or may be set by an RV manufacturer to correspond to the distance presented by the RV's slide-outs. The light source may be a laser or other light source that provides a wider beam.

Figure 7:
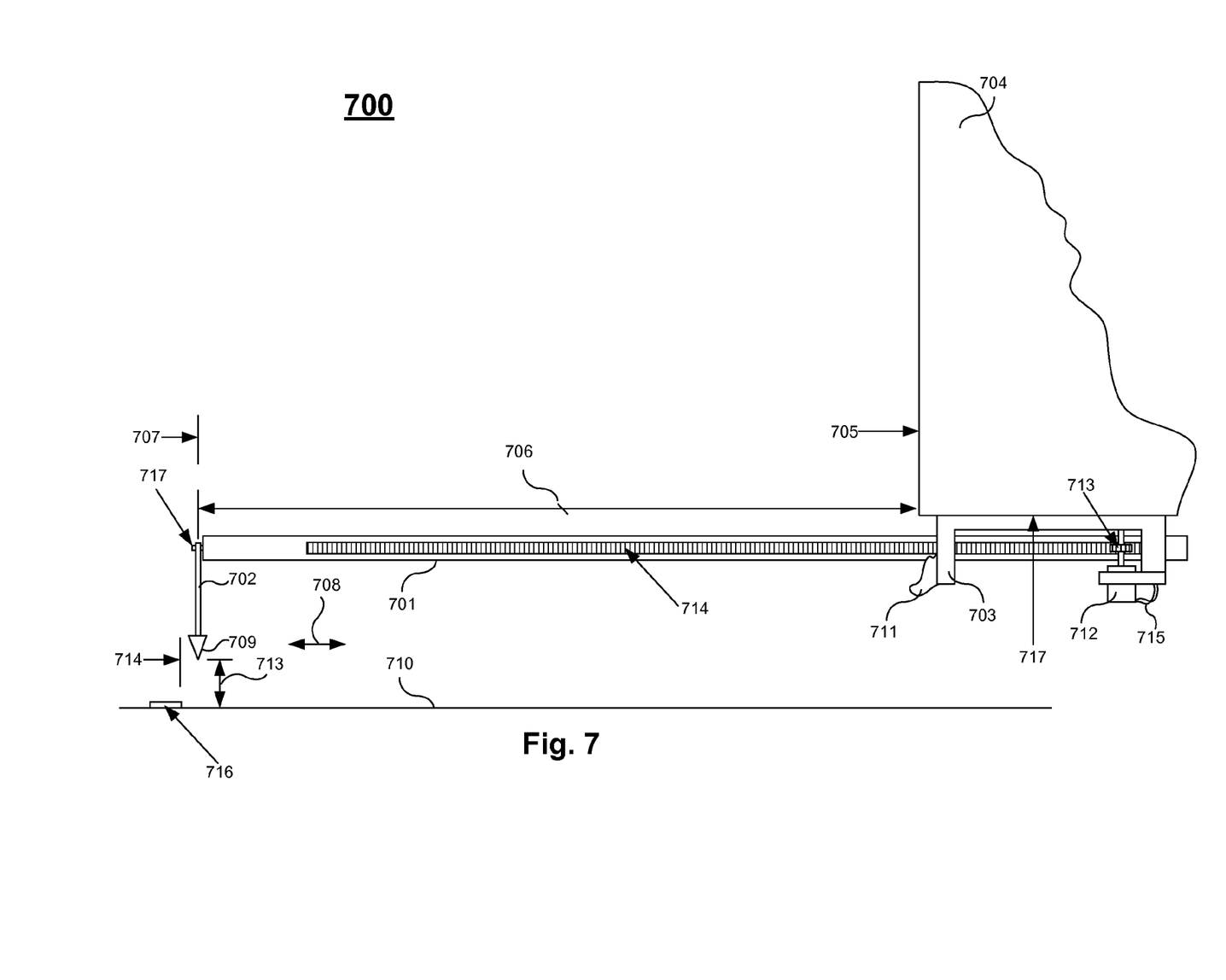
FIG. 7 illustrates a parking indicator apparatus according to yet another embodiment of the present invention.

FIG. 7 illustrates parking indicator apparatus 700 according to yet another embodiment of the present invention. Parking indicator apparatus 700 includes a horizontal member 701, a vertical member 702, a mounting member 703, and an indicator 709 which are similar to horizontal member 101, vertical member 102, mounting member 103, and indicator 109 of parking indicator apparatus 100 of FIG. 1. Mounting member 703 is attached to the bottom 717 of vehicle 704. Horizontal member 701 is coupled to mounting member 703 and is shown in a fully deployed position. Mounting member 703 extends horizontal member 701 a distance 706 from side 705 of vehicle 704.

An electric motor 712 is coupled to mounting member 703 to move horizontal member 701 in either direction 708. Electric motor 712 has a shaft coupled to gear 713 which has teeth to drive the indentations 714 on horizontal member 701. Mounting member 703 may include bearings or rollers to assist in providing smooth movement of horizontal member 701. Cables 715 may be coupled to an electronic board providing drive signals to operate electric motor 712. The electronic board may be controlled by a microcontroller which uses signals from limit switches to determine the fully deployed position and the fully stored position. Intermediate positions may be incrementally programmed if a stepper motor and control circuit are used in the design of the electronic board.

Hinging member 717 may couple vertical member 702 to horizontal member 701 such that vertical member 702 may swing back and forth while maintaining distance 706. Indicator 709 is coupled to vertical member 702 to set a distance 713 from the ground 710. Indicator 709 indicates horizontal periphery 707 of vehicle 704. Periphery 707 may be the side of a boat over hanging along the sides of a trailer, for example. Also as an example, periphery 707 may be the end of a slide-out of an RV in an extended position after parking. Indicator 709 may be used to compare periphery 707 to the periphery 714 of a parking space (indicated by line 716).

In one embodiment, parking indicator apparatus 700 may use slide 711 to place vertical member 702 into a stored position. For example, electric motor 712 retracts horizontal member 701 from the fully deployed position and as vertical member 702 comes into contact with slide 711, vertical member 702 swings up until its shaft falls into the notch at the top of slide 711. This may allow for automatic deployment and retraction of parking indicator apparatus 700.

In another embodiment, mounting member 703 may be coupled to vehicle 704 through a swivel. This may be used to prevent horizontal member 701 from being damaged if it comes into contact with a stationary object such as a fence post. The swivel mechanism may also be used to selectively deploy the horizontal member 701. In yet another embodiment, parking indicator apparatus 700 may engage gear 713 with a hand adjustment rather than motor 712 such that small adjustments of less than 20 inches may be made at the factory to accommodate RV alternatives for slide-out sizes. In this embodiment, a reduced length of indentations 714 may be required, and the swivel may be used to store the parking indicator apparatus 700 below vehicle 704 when not in use.

In yet another embodiment, mounting member 703 may be selectively coupled to vehicle 704 by mating of a magnet to a metal surface. In one instance mounting member 703 includes a magnet and vehicle 704 includes a metal surface to mate with mounting member 703. In another instance, vehicle 704 includes a magnet and vehicle 704 includes a metal surface to mate with this magnet. The location of the magnet or metal surface may depend on the configuration of the parking indicator apparatus. For example, in FIG. 3 the metal surface may be on side 305 of RV 304 and mounting member 303 may include a magnet to mate to this metal surface.

The above description illustrates various embodiments of the present invention along with examples of how aspects of the present invention may be implemented. The above examples and embodiments should not be deemed to be the only embodiments, and are presented to illustrate the flexibility and advantages of the present invention. For example, although these embodiments may be used ideally for RVs, they may be used also with trailers (e.g. fifth wheels), trucks with bed campers that have slide-outs or "pop-outs", or any other vehicle requiring alignment and spacing in a limited area. Based on the above disclosure, other arrangements, embodiments, implementations and equivalents will be evident to those skilled in the art and may be employed without departing from the spirit and scope of the invention.

What is claimed is:

1. An apparatus to assist in parking a recreational vehicle (RV), said apparatus comprising:
    a first member coupled to said RV such that said first member extends out from a side of said RV; and
    a second member coupled to said first member,
    wherein said second member provides an indicator of a location of a horizontal boundary, said horizontal boundary corresponding to a parking clearance required for said RV, and wherein said second member is a light weight metal tape having a shape of a slight bow to resist horizontal movement.

2. The apparatus of claim 1 wherein said parking clearance corresponds to a distance required for an extended slide-out of said RV.

3. The apparatus of claim 1 wherein said first member extends out such that the length of said first member establishes said parking clearance.

4. The apparatus of claim 1 wherein at least a portion of said second member is translucent and illuminated by light rays emanating from a side marker light of said RV.

5. The apparatus of claim 1 wherein said indicator moves in parallel with said side thereby providing a dynamic indication of said horizontal boundary.

6. A method to assist in parking an RV, said method comprising:
    extending a first member out to a side of said RV;
    indicating a location of a horizontal boundary with a second member, wherein said horizontal boundary corresponds to a parking clearance required for said RV; and
    said second member resisting horizontal movement, wherein a slight bow shape of a light weight metal tape of said second member aids in said resisting.

7. The method of claim 6 wherein said parking clearance corresponds to a distance required for an extended slide-out of said RV.

8. The method of claim 6 further comprising illuminating at least a portion of said vertical member that is translucent, wherein light rays emanate from a side marker light of said RV to provide said illuminating.

9. The method of claim 6 wherein said indicating includes dynamically moving an indication in parallel with said side such that said indication of said horizontal boundary is more visible.

10. The method of claim 6 further comprising:
moving said first member in response to a force applied, wherein a mounting member coupled between said RV and said first member allows said moving of said first member, and
returning said first member to an initial position when said force is removed.

11. An apparatus to aid in parking a vehicle, said apparatus comprising:
a mounting member coupled to said vehicle;
a horizontal member coupled to said mounting member, wherein said horizontal member extends from said vehicle, and wherein said horizontal member defines a required distance from a side of said vehicle to a first periphery of a parking space;
a vertical member coupled to said horizontal member that defines a second periphery; and
an indicator coupled to said vertical member such that said first periphery may be compared with said second periphery in aligning the vehicle within said parking space.

12. The apparatus of claim 11 further comprising a hinging member that couples said vertical member to said horizontal member such that said vertical member may swing while remaining at said second periphery.

13. The apparatus of claim 11 wherein said mounting member is selectively coupled to said vehicle by mating of a magnet to a metal surface.

14. The apparatus of claim 11 wherein said mounting member lies below said RV such that a portion of said horizontal member lies along said mounting member, wherein said horizontal member may be selectively deployed when parking said vehicle.

15. The apparatus of claim 11 further comprising a swivel coupled between said mounting member and said vehicle such that said horizontal member may be selectively deployed.

16. The apparatus of claim 11 further comprising a gear coupled to said horizontal member and a stepper motor coupled to drive said gear, wherein said stepper motor is driven such that said horizontal member may be incrementally deployed.

17. The apparatus of claim 1 further comprising a motor coupled to said horizontal member, wherein said motor retracts said horizontal member from a fully deployed position.

18. The method of claim 6 further comprising retracting said horizontal member from a fully deployed position.

19. The apparatus of claim 11 wherein said indicator is a laser, and wherein said laser and said horizontal member form a light source member.

20. The method of claim 19 wherein said light source member is arranged at an angle by said vertical member, and wherein said vertical member and said mounting member form a mounted member.

\* \* \* \* \*